United States Patent [19]

Golovoy et al.

[11] Patent Number: 5,281,664
[45] Date of Patent: Jan. 25, 1994

[54] POLYMER COMPOSITIONS AND METHODS OF MAKING SAME

[75] Inventors: Amos Golovoy, Canton; Mo-Fung Cheung, Farmington Hills, both of Mich.

[73] Assignee: Ford Motor Company, Dearborn, Mich.

[21] Appl. No.: 915,498

[22] Filed: Jul. 20, 1992

[51] Int. Cl.$^5$ .................... C08G 63/48; C08G 63/91
[52] U.S. Cl. .................... 525/64; 525/68; 525/189; 525/197; 525/133; 525/902; 525/906
[58] Field of Search ............... 525/64, 68, 189, 197, 525/133, 902, 906

[56] References Cited

U.S. PATENT DOCUMENTS

| | | | |
|---|---|---|---|
| 3,546,319 | 12/1970 | Prevorsek | 525/66 |
| 4,021,596 | 5/1977 | Bailey | 525/906 |
| 4,338,413 | 7/1982 | Coran et al. | 525/179 |
| 4,360,636 | 11/1982 | Silberberg | 525/64 |
| 4,373,067 | 2/1983 | Dieck et al. | 525/146 |
| 4,567,235 | 1/1986 | Sasaki et al. | 525/113 |
| 4,567,238 | 1/1986 | Sasaki et al. | 525/179 |
| 4,657,971 | 4/1987 | Shiraki et al. | 525/64 |
| 4,717,751 | 1/1988 | Yates, III et al. | 525/166 |
| 4,873,286 | 10/1989 | Galluci et al. | 525/92 |
| 4,879,324 | 11/1989 | Lausberg et al. | 523/40 C |
| 4,923,923 | 5/1990 | Struss et al. | 525/64 |
| 4,942,200 | 7/1990 | Flexman et al. | 525/66 |
| 4,985,175 | 1/1991 | Dziurla et al. | 525/64 |

FOREIGN PATENT DOCUMENTS

| | | | |
|---|---|---|---|
| 0411406 | 2/1991 | European Pat. Off. | 525/68 |
| 61-037837 | 2/1986 | Japan | 525/68 |
| 63-304046 | 12/1988 | Japan | 525/64 |

OTHER PUBLICATIONS

"Morphology and Properties of Toughened Poly(phenylene oxide) Polyamide Blends", Journal of Materials Science, vol. 24, pp. 2025–2030, 1989.

*Primary Examiner*—Melvyn I. Marquis
*Assistant Examiner*—Helen F. Lee
*Attorney, Agent, or Firm*—Lorraine S. Melotik; Roger L. May

[57] ABSTRACT

A novel process of sequentially mixing polymers comprising
a. mixing together and melt blending impact modifier and semicrystalline polymer to form a preblend, and
b. mixing together and melt blending the preblend with amorphous polymer, and polymer compositions produced as a result of the novel process are disclosed.

5 Claims, No Drawings

POLYMER COMPOSITIONS AND METHODS OF MAKING SAME

FIELD OF THE INVENTION

Embodiments of the present invention relate generally to novel polymer compositions and to a novel method of making polymer compositions. More specifically, the present invention relates to a novel method of sequentially mixing components to produce a novel polymer composition characterized by improved physical properties. In another aspect, the present invention relates to objects fabricated from polymer compositions produced according to the method of the present invention.

BACKGROUND OF THE INVENTION

Polymer compositions are generally useful in manufacturing objects by employing techniques commonly used with thermoplastic materials, e.g., injection molding, extrusion, blow molding, melt spinning, and stamping. Semicrystalline and amorphous polymers are commonly blended together to obtain polymer compositions having desirable physical characteristics.

Unfortunately, many semi-crystalline and amorphous polymer compositions can be brittle and crack upon impact making them undesirable for certain applications requiring high impact resistance, for example, in the fabrication of automobile body panels. The desire to improve toughness of polymer compositions has led to the use of impact modifiers, also known as elastomers or elastomeric polymers. Impact modifiers improve the toughness of an otherwise brittle polymer composition by imparting elastic properties to the polymer composition. Generally, the impact modifiers are melt blended simultaneously with the semicrystalline and amorphous polymers to produce a polymer composition which is then injection molded or otherwise formed into a desired shape.

Gallucci et al. U.S. Pat. No. 4,873,286 discloses an improved process for the manufacture of polyphenylene ether-polyamide compositions wherein a polycarboxylic acid modifier is precompounded with either the polyamide or, preferably the polyphenylene ether prior to compounding with the other polymer. The polycarboxylic acid modifier is employed to modify surface properties of the resulting polymer composition. The polycarboxylic acid modifier is not an impact modifier. Gallucci et al. broadly suggests that other components such as impact modifiers, reinforcing agents, stabilizers and the like, may optionally be precompounded into the resulting polycarboxylic acid modified polyphenylene ether-polyamide compositions.

It has also been suggested to initially blend a butadiene copolymer with a polyamide prior to blending with a polyepoxy compound. See Sasaki et al. U.S. Pat. Nos. 4,567,235 and 4,567,238. Additionally, Flexman et al. U.S. Pat. No. 4,942,200 discloses preblending a polyarylate and an epoxy functional polymer before blending with either a polyamide or an elastomeric modifier. It is also known that certain impact modifiers preferentially disperse within poly(phenylene oxide) rather than Nylon-6,6 in a poly(phenylene oxide)-Nylon 6,6-polymer composition. This is discussed in an article entitled "Morphology and Properties of Toughened Poly(Phenylene Oxide)-Polyamide Blends", Hobbs, S.Y., Dekkers, M.E.J. and Watkins, V.H. *Journal of Materials Science* vol. 24 pp. 2025–2030 (1989).

A need exists to develop sequentially mixing or preblending components to obtain certain physical characteristics of a semicrystalline and amorphous polymer blend to accommodate various utilities.

SUMMARY OF THE INVENTION

Embodiments of the present invention are directed to novel polymer compositions having enhanced physical properties. The polymer compositions of the present invention are prepared according to a novel melt blending sequence which employs the preparation of a preblend of impact modifier and semicrystalline polymer. The preblend is then subsequently melt blended with amorphous polymer. In certain preferred embodiments, the resulting polymer compositions exhibit unexpected and enhanced qualities of utility, especially toughness, and may be used, for example, in applications involving materials subject to impact, high temperature and other adverse environmental conditions.

DESCRIPTION OF CERTAIN PREFERRED EMBODIMENTS

The polymer compositions of the present invention include as components, at least semicrystalline polymer, amorphous polymer and impact modifier. Other materials, for example, antioxidants, fillers, pigments, UV stabilizers, polymeric compatibilizers such as di-block copolymers, other polymers, additives and the like may be included to impart desired physical characteristics to the polymer compositions for use in certain applications. All percentages used to designate percent composition of components of the polymer compositions of the present invention is exclusive of these other materials.

The components are mixed according to a novel melt blending sequence which in accordance with certain preferred embodiments enables one to achieve a polymer composition suitable for applications requiring certain physical characteristics, for example, toughness, stiffness, heat resistance, solvent resistance and the like. As a result of these desirable properties, certain preferred embodiments of polymer compositions may be used in the fabrication of objects, such as automobile body panels, which are subjected to impact or other adverse environmental conditions, as well as high temperatures encountered, for example, in the process of baking coatings onto the object.

Semicrystalline polymers used in the polymer compositions of the present invention are characterized by an ability to form crystals in a solid state structure. The semicrystalline polymers have a physical structure defined by an aggregation of crystalline and non-crystalline regions. In the crystalline regions, the polymer chains or subunits of polymer chains are extended in a definite characteristic three-dimensional arrangement extending over a distance which is large compared to atomic dimensions, i.e. the polymer chains or subunits of polymer chains are arranged together regularly to form a crystallite.

Preferred semicrystalline polymers include semicrystalline polyalkyleneterephthalates, semicrystalline polyamides, semicrystalline polyolefins, semicrystalline polyalkylene sulfides, and polymers having similar physical and chemical characteristics. Certain specific semicrystalline polymers particularly useful in certain preferred embodiments of the present invention include polyethyleneterephthalate, polybutyleneterephthalate, polyethylene, polypropylene, nylon 6, nylon 6,6 and polyphenylene sulfide.

The semicrystalline polymers are present in an amount between about 10% to 70% by weight of the polymer composition with a preferred range being about 20% to 60% by weight and with a more preferred range being about 25% to 45% by weight of the polymer compositions. Specific preferred percentages of 25% and 45% of the semicrystalline polymers are detailed in the Examples to follow.

Amorphous polymers used in the polymer compositions of the present invention are characterized by a lack of ability to form crystals in a solid state structure, i.e. the amorphous polymers do not have a regular three-dimensional arrangement of polymer chains or subunits of polymer chains. Examples of preferred amorphous polymers include amorphous polycarbonates, amorphous polyalkylacrylates, amorphous polysulphones, amorphous polyamides and amorphous polymers having similar physical and chemical characteristics. Certain specific amorphous polymers particularly useful in certain preferred embodiments of the present invention include polycarbonate, polystyrene, polyarylate, polyphenylene oxide, polymethylmethacrylate, polyethersulfone, polyphenylsulphone and amorphous nylon.

The amorphous polymers are present in an amount between about 35% to 90% by weight of the polymer composition with a preferred range being about 40% to 70% by weight and with a more preferred range being about 45% to 65% by weight of the polymer compositions. Specific preferred percentages of 45% and 65% of the amorphous polymers are detailed in the Examples to follow.

Impact modifiers useful in the polymer compositions of the present invention will include those commonly used in thermoplastic compositions. The impact modifiers are characterized by an ability to impart elastic properties to a polymer composition. Use of an impact modifier decreases brittleness of the polymer composition, thereby increasing toughness or an ability to withstand impact without breaking. Examples of preferred impact modifiers include polyalkylenes such as polybutadiene compounds and those having similar physical and chemical characteristics. Certain specific impact modifiers particularly useful in certain preferred embodiments of polymer compositions of the present invention include methacrylate-butadiene-styrene (MBS). This impact modifier has a core-shell structure with the methacrylate at the shell. The core-shell structure is advantageous in that it facilitates discreet dispersion of the impact modifier in the polymer.

The impact modifiers are present in an amount between about greater than 0% to 30% by weight of the polymer composition with a preferred range being about greater than 0% to 20% by weight of the polymer composition with a more preferred range being greater than 0% to 15% and with a most preferred range being greater than 0% to 10% by weight of the polymer composition. Specific preferred percentages of the impact modifiers are detailed in the Examples to follow.

As previously stated, other materials may be melt blended into the polymer compositions of the present invention to impart certain desirable characteristics. Examples include antioxidants, fillers, pigments, UV stabilizers, polymeric compatibilizers such as di-block copolymers, other polymers, additives and the like commonly used in thermoplastic compositions. Such materials typically are used in small quantities, for example, 1% or less. The percentages of such materials, however, are not included into the percentages of components of the polymer compositions of the present invention.

The novel polymer compositions of the present invention are produced according to a novel melt blending sequence. The melt blending of the components of the composition can be carried out in any conventional extrusion apparatus equipped with side feeding capability or other apparatus which would allow mixing to be carried out sequentially.

According to a preferred embodiment of the present invention, impact modifier and semicrystalline polymer are mixed and then charged to an extruder where they are then melt blended to achieve intimate mixing of the two materials thereby forming a preblend. The preblend and amorphous polymer are then mixed and then charged to an extruder where they are melt blended to produce the novel polymer compositions of the present invention.

While not being limited by scientific theory, the novel blending sequence is thought to disperse the impact modifier throughout the semicrystalline polymer prior to blending with the amorphous polymer resulting in increased toughness of the polymer composition as compared to blending the impact modifier, the semicrystalline polymer and the amorphous polymer simultaneously. In simultaneous mixing, it is thought that the impact modifier has a disadvantageous preference for dispersing throughout the amorphous polymer.

Additionally, according to certain preferred embodiments, the novel blending sequence allows one to achieve and maintain toughness with a minimum amount of impact modifier, i.e. the ability of the impact modifier to impart toughness is enhanced when the impact modifier is dispersed throughout the semicrystalline polymer prior to addition of the amorphous polymer. Additionally, a minimum amount of impact modifier allows the polymer composition to achieve advantageous heat deflection properties for uses which subject the polymer composition to high temperatures. As the content of impact modifier is increased heat deflection properties generally decrease. Furthermore, since a minimum amount of impact modifier is achieved, amounts of the semicrystalline polymer and the amorphous polymer my be varied to a greater degree as desired to achieve varying physical characteristics of the resulting polymer compositions. The result is a method which allows one to tailor a polymer composition to specific impact and heat resistant requirements. It is recognized that some of the impact modifier may disperse into the amorphous polymer upon mixing with the preblend, however a substantial amount of impact modifier effective to increase toughness of the polymer blend remains dispersed throughout the semicrystalline polymer.

According to certain preferred embodiments, the polymer composition can maintain toughness, stiffness and heat deflection capabilities after exposure to high temperatures. This results in the improved ability to subject objects manufactured from the polymer compositions to high temperatures without sacrificing toughness or stiffness due to softening of the impact modifier. The novel blending sequence produces polymer compositions which may be processed into useful objects by the many fabricating processes known to those familiar with the art of fabricating thermoplastics. Such objects include automobile body panels which are subjected to high temperatures during the baking of coatings onto the panel surface or other automobile parts such as casings for headlamps, engine intake manifolds, air inlets, and support hoses which may be subjected to fuels and solvents in addition to high temperatures. This list is not meant to be exhaustive, as one skilled in the art will recognize the usefulness of a polymer composition having improved toughness, stiffness and heat deflection capability.

Toughness of objects fabricated from certain preferred polymer compositions of the present invention may be measured, for example, by notched Izod impact testing. The notched Izod impact test generally involves a falling pendulum striking a fixed, notched specimen of a polymer composition with 120 foot-pounds (163 joules) of energy at a velocity of 11.5 feet (3.5 meters) per second. The height of the pendulum swing after striking the polymer composition is a measure of the energy absorbed and thus indicates impact strength. Results are indicated in units of joules per meter.

The following examples set forth certain specific embodiments of the invention and are provided to enable those of skill in the art to practice the invention and, further, to illustrate the utility of the invention in certain applications. These examples should not be construed to limit the scope of the invention, which is limited only by the lawful scope of the appended claims.

EXAMPLE I 1000 grams of a methacrylate-butadiene-styrene impact modifier available commercially from Rohm and Haas Co. as Paraloid EXL 3607 was charged to a V-shape dry blender. The amount of methacrylate-butadiene-styrene equaled about 10% by weight of the resulting polymer composition. 4500 grams of a polyphenylene sulfide semicrystalline polymer was then charged to the V-shape dry blender. The contents of the V-shape dry blender were then mixed for about 5 minutes. The amount of polyphenylene sulfide equaled about 45% by weight of the resulting polymer composition. The mixed contents of the V-shape dry blender were then melt blended in an extruder at 285° C. to achieve intimate mixing of the materials and to form a preblend of the impact modifier and the semicrystalline polymer. The resulting preblend was then cooled in a water bath and pelletized. 4500 grams of a polysulphone amorphous polymer were then mixed with the pelletized preblend in a V-shape dry blender for about five minutes. The amount of polysulphone equaled about 45% by weight of the resulting polymer composition. The mixed contents were then melt blended in an extruder at 285° C. to achieve intimate mixing and to produce the polymer compositions of the present invention.

A polymer composition was produced using simultaneous mixing of the above components. The polyphenylene sulfide semicrystalline polymer, the polysulphone amorphous polymer and the methacrylate-butadiene-styrene impact modifier were charged to a V-shape dry blender and mixed for about 5 minutes. The mixed contents were then melt blended in an extruder at 285° C. to achieve intimate mixing. Both polymer compositions were injection molded at 300° C. to obtain specimens which were tested for toughness according to Notched Izod Impact Testing after molding and after annealing at 160° C. for 2 hours. The data outlined below shows increased toughness of the sample produced as a result of the novel method of sequentially mixing and melt blending the impact modifier with a semicrystalline polymer to form a preblend and then mixing and melt blending the preblend with an amorphous polymer.

| NOTCHED IZOD TEST RESULTS | | |
| --- | --- | --- |
| MIXING | AS-MOLDED | AFTER ANNEALING (160° C., 2 hrs) |
| Simultaneous | 100 J/m | 70 J/m |
| Sequential | 215 J/m | 130 J/m |

EXAMPLE II 1000 grams of a methacrylate-butadiene-styrene impact modifier available commercially from Rohm and Haas Co. as Paraloid EXL 3607 was charged to a V-shape dry blender. The amount of methacrylate-butadiene-styrene equaled about 10% by weight of the resulting polymer composition. 2500 grams of a polyphenylene sulfide semicrystalline polymer was then charged to the V-shape dry blender. The contents of the V-shape dry blender were then mixed for about 5 minutes. The amount of polyphenylene sulfide equaled about 25% by weight of the resulting polymer composition. The mixed contents of the V-shape dry blender were then melt blended in an extruder at 285° C. to achieve intimate mixing of the materials and to form a preblend of the impact modifier and the semicrystalline polymer. The resulting preblend was then cooled in a water bath and pelletized. 6500 grams of a polysulphone amorphous polymer were then mixed with the pelletized preblend in a V-shape dry blender for about five minutes. The amount of polysulphone equaled about 65% by weight of the resulting polymer composition. The mixed contents were then melt blended in an extruder at 285° C. to achieve intimate mixing and to produce the polymer compositions of the present invention.

A polymer composition was produced using simultaneous mixing of the above components. The polyphenylene sulfide semicrystalline polymer, the polysulphone amorphous polymer and the methacrylate-butadiene-styrene impact modifier were charged to a V-shape dry blender and mixed for about 5 minutes. The mixed contents were then melt blended in an extruder at 285° C. to achieve intimate mixing. Both polymer compositions were injection molded at 300° C. to obtain specimens which were tested for toughness according to Notched Izod Impact Testing after molding and after annealing at 160° C. for 2 hours. The data outlined below shows increased toughness of the sample produced as a result of the novel method of sequentially mixing and melt blending the impact modifier with a semicrystalline polymer to form a preblend and then mixing and melt blending the preblend with an amorphous polymer.

| NOTCHED IZOD TEST RESULTS | | |
| --- | --- | --- |
| MIXING | AS-MOLDED | AFTER ANNEALING (160° C., 2 hrs) |
| Simultaneous | 900 J/m | 370 J/m |
| Sequential | 950 J/m | 700 J/m |

The above examples indicate an important advantage of the novel melt blending sequence of the present invention. Since the novel melt blending sequence produces a polymer composition having desirable toughness with a minimum amount of impact modifier, amounts of the semicrystalline polymer and the amorphous polymer may be varied to a greater degree taking advantage of the properties of those polymers. Generally, increasing the semicrystalline polymer composition increased solvent resistance properties while increasing the amorphous polymer composition increased impact resistance properties. Comparing the sequentially blended polymer compositions of Examples I and II, the data suggests that the polymer composition of Example II, which has more amorphous polymer and less semicrystalline polymer than Example I, has higher impact resistance and thus would be better suited for applications where the polymer composition would be subject to substantial impact. Alternatively, the polymer composition of Example I, which has more semicrystalline polymer and less amorphous polymer, has lower impact properties and would be better suited for applications where the polymer composition would be subject to little impact and greater solvent interaction. The ability to tailor a polymer composition to specific impact properties, heat deflection properties and solvent properties as required by different applications is a direct and important advantage gained by the novel melt blending sequence of the present invention.

It is to be understood that the embodiments of the invention which have been described are merely illustrative of some applications of the principles of the invention. Numerous modifications may be made by those skilled in the art without departing from the true spirit and scope of the invention.

What is claimed is:

1. A process for the preparation of a polymer composition comprising in sequence, the steps of,
   a. mixing together and melt blending a polymer of methacrylate-butadiene-styrene impact modifier present in an amount between greater than 0% to about 10% by weight of the polymer composition and polyphenylene sulfide semicrystalline polymer present in an amount between about 25% to about 45% by weight of the polymer composition to form a preblend, and
   b. mixing together and melt blending the preblend with polysulphone amorphous polymer present in an amount between about 45% to about 65% by weight of the polymer composition,
   such that the polymer composition is characterized by the impact modifier being preferentially dispersed throughout the semicrystalline polymer.

2. The process of claim 1 wherein the methacrylate-butadiene-styrene impact modifier is present in amount about 10% by weight of the polymer composition, the polyphenylene sulfide semicrystalline polymer is present in an amount about 45% by weight of the polymer composition, and the polysulfone amorphous polymer is present in an amount about 45% by weight of the polymer composition.

3. The process of claim 1 wherein the methacrylate-butadiene-styrene impact modifier is present in amount about 10% by weight of the polymer composition, the polyphenylene sulfide semicrystalline polymer is present in an amount about 25% by weight of the polymer composition, and the polysulfone amorphous polymer is present in an amount about 65% by weight of the polymer composition.

4. A process for the preparation of a polymer composition comprising in sequence, the steps of,
   a. mixing together and melt blending a polymer of methacrylate-butadiene-styrene impact modifier and polyphenylene sulfide semicrystalline polymer to form a preblend, and
   b. mixing together and melt blending the preblend with polysulphone amorphous polymer,
   such that the polymer composition is characterized by the impact modifier being preferentially dispersed throughout the semicrystalline polymer,
   wherein the methacrylate-butadiene-styrene impact modifier is present in an amount about 10% by weight of the polymer composition, the polyphenylene sulfide semicrystalline polymer is present in an amount about 45% by weight of the polymer composition, and the polysulphone amorphous polymer is present in an amount about 45% by weight of the polymer composition.

5. A process for the preparation of a polymer composition comprising in sequence, the steps of,
   a. mixing together and melt blending a polymer of methacrylate-butadiene-styrene impact modifier and polyphenylene sulfide semicrystalline polymer to form a preblend, and
   b. mixing together and melt blending the preblend with polysulphone amorphous polymer,
   such that the polymer composition is characterized by the impact modifier being preferentially dispersed throughout the semicrystalline polymer,
   wherein the methacrylate-butadiene-styrene impact modifier is present in an amount about 10% by weight of the polymer composition, the polyphenylene sulfide semicrystalline polymer is present in an amount about 25% by weight of the polymer composition, and the polysulphone amorphous polymer is present in an amount about 65% by weight of the polymer composition.

* * * * *